United States Patent
Santan et al.

(10) Patent No.: US 11,861,010 B2
(45) Date of Patent: Jan. 2, 2024

(54) EXTENSIBLE DEVICE HOSTED ROOT OF TRUST ARCHITECTURE FOR INTEGRATED CIRCUITS

(71) Applicant: Xilinx, Inc., San Jose, CA (US)

(72) Inventors: Sonal Santan, San Jose, CA (US); Yu Liu, Newark, CA (US); Yenpang Lin, Campbell, CA (US); Lizhi Hou, Santa Clara, CA (US); Cheng Zhen, San Jose, CA (US); Yidong Zhang, Fremont, CA (US)

(73) Assignee: Xilinx, Inc., San Jose, CA (US)

( * ) Notice: Subject to any disclaimer, the term of this patent is extended or adjusted under 35 U.S.C. 154(b) by 129 days.

(21) Appl. No.: 17/651,030

(22) Filed: Feb. 14, 2022

(65) Prior Publication Data
US 2023/0259627 A1 Aug. 17, 2023

(51) Int. Cl.
| G06F 21/64 | (2013.01) |
| G06F 21/71 | (2013.01) |
| G06F 21/57 | (2013.01) |
| G06F 13/16 | (2006.01) |

(52) U.S. Cl.
CPC ........ *G06F 21/572* (2013.01); *G06F 13/1642* (2013.01); *G06F 13/1663* (2013.01); *G06F 21/64* (2013.01); *G06F 21/71* (2013.01)

(58) Field of Classification Search
USPC ........................................................ 726/26
See application file for complete search history.

(56) References Cited

U.S. PATENT DOCUMENTS

| 8,880,952 B1* | 11/2014 | Labonte | G06F 11/3664 |
| | | | 717/124 |
| 9,904,555 B2* | 2/2018 | Sasanka | G06F 1/3287 |
| 10,031,760 B1 | 7/2018 | Santan et al. | |
| 10,216,217 B1 | 2/2019 | Santan et al. | |
| 10,402,223 B1 | 9/2019 | Santan et al. | |
| 10,608,641 B2 | 3/2020 | Yu et al. | |
| 10,621,299 B1 | 4/2020 | Yu et al. | |
| 10,651,853 B1 | 5/2020 | Kong et al. | |
| 10,817,353 B1 | 10/2020 | Kain et al. | |
| 10,877,766 B2 | 12/2020 | Soe et al. | |
| 11,295,000 B1* | 4/2022 | Shtalenkov | G06F 9/5027 |
| 2014/0068585 A1* | 3/2014 | Young | G06F 21/572 |
| | | | 717/168 |

(Continued)

FOREIGN PATENT DOCUMENTS

| GB | 2545534 A * | 6/2017 | G06F 21/32 |
| WO | 2020018942 A1 | 1/2020 | |

*Primary Examiner* — Sakinah White Taylor
(74) *Attorney, Agent, or Firm* — Kevin T. Cuenot

(57) ABSTRACT

An integrated circuit can include a communication endpoint configured to maintain a communication link with a host computer, a queue configured to receive a plurality of host commands from the host computer via the communication link, and a processor configured to execute a device runtime. The processor, responsive to executing the device runtime, is configured to perform validation of the host commands read from the queue and selectively execute the host commands based on a result of the validation on a per host command basis. The host commands are executable by the processor to manage functions of the integrated circuit. The queue is implemented in a region of memory that is shared by the integrated circuit and the host computer.

20 Claims, 5 Drawing Sheets

(56) References Cited

U.S. PATENT DOCUMENTS

| | | | | |
|---|---|---|---|---|
| 2017/0139721 A1* | 5/2017 | Feehrer | ............... | G06F 13/20 |
| 2019/0361708 A1* | 11/2019 | Soe | ............... | G06F 9/5027 |
| 2020/0183669 A1* | 6/2020 | Mola | ............... | G06F 11/3648 |
| 2021/0406381 A1* | 12/2021 | Heisrath | ............... | H04L 63/108 |
| 2022/0171648 A1* | 6/2022 | Rodriguez | ............... | G06F 9/5072 |

* cited by examiner

US 11,861,010 B2

EXTENSIBLE DEVICE HOSTED ROOT OF TRUST ARCHITECTURE FOR INTEGRATED CIRCUITS

TECHNICAL FIELD

This disclosure relates to integrated circuits (ICs) and, more particularly, to an extensible and device implemented root of trust architecture for ICs.

BACKGROUND

A heterogeneous computing system (HCS) refers to a type of data processing system that includes one or more host processors and one or more other processing devices. The host processor is typically implemented as a central processing unit (CPU) and may be disposed in a computer system such as a server. The host processor is coupled to the other processing devices through one or more communication channels. The other processing devices, which are typically architecturally different from the host processor, are capable of performing tasks offloaded from the host processor and making results of the tasks available to the host processor. Examples of such other processing devices may include, but are not limited to, graphics processing unit(s) (GPUs), digital signal processor(s) (DSPs), and programmable ICs (e.g., field programmable gate arrays or other devices including programmable circuitry or programmable logic).

Within the context of an HCS, the host computer, e.g., the host processor, is considered a trusted entity. That is, the other processing devices treat the host processor as the "Root of Trust" from which trust and security flow over to the processing devices. In this paradigm, the processing devices "trust" any commands and/or data that are received from the host system. Further, the internal registers of the processing devices are often exposed to the host system meaning that the host system is capable of directly reading and/or writing to the internal registers of the processing devices. This means that the host processor, being a trusted entity, is capable directly controlling operation of these other processing devices by way of reading from the control registers to determine status of the other processing device(s) and/or writing to these control registers to directly exert control over these other processing device(s).

SUMMARY

In one or more example implementations, an integrated circuit (IC) can include a queue configured to receive host commands from a host computer via a communication link with the host computer. The IC can include a processor coupled to the queue and configured to operate as a Root of Trust (RoT) for the IC through execution of firmware. The processor, responsive to executing the firmware, is configured to perform validation of the host commands read from the queue. The processor also can selectively execute the host commands in response to a successful validation of the host commands on a per host command basis. The host commands are executable by the processor to manage functions of the IC. The queue is implemented in a region of memory that is shared by the IC and the host computer.

In one or more example implementations, a method can include receiving, from a host computer and within a queue of the IC, a host command over a communication link with the host computer. The method can include validating, using a processor disposed in the IC, the host command. The method can include, responsive to successfully validating the host command, executing the host command using the processor. The host command is executable by the processor to manage a function of the IC. The method can include preventing the host computer from directly accessing control registers of circuit blocks of the IC via the communication link.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

DETAILED DESCRIPTION

Figure 1:
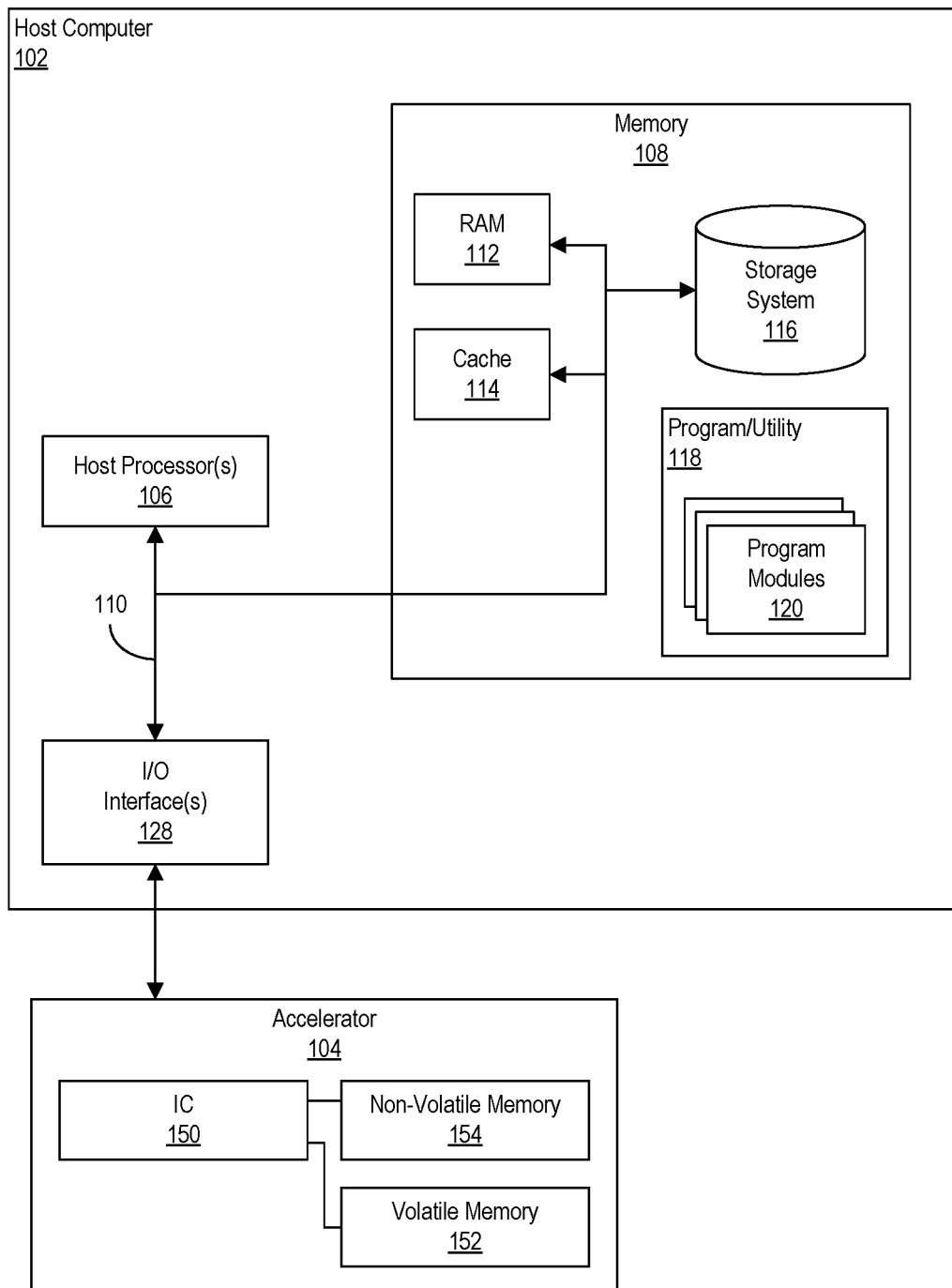
FIG. 1 illustrates an example of a Heterogeneous Computing System (HCS) in accordance with the inventive arrangements described herein.

This disclosure relates to integrated circuits (ICs) and, more particularly, to an extensible and device implemented root of trust (RoT) architecture for ICs. An IC, e.g., as part of an accelerator, may be communicatively linked with a host computer as part of a Heterogeneous Computing System (HCS). The IC is capable of performing various operations offloaded from the host computer. In accordance with the inventive arrangements described within this disclosure, the IC is capable of implementing a self-hosted RoT architecture in which the host computer is not trusted and does not serve as the RoT within the HCS at least with respect to operation of the IC. The RoT architecture may be implemented within the IC itself as a combination of hardware and software. The hardware is capable of executing firmware that, upon execution, allows the hardware to operate as the RoT within the IC. Upon execution of the firmware, the RoT architecture is capable of performing core management services for the IC, e.g., particular functions reserved for the RoT architecture.

In one or more example implementations, the firmware executed by the RoT architecture is extensible. A computing service provider, for example, may customize the firmware by adding functionality, removing or limiting certain functionality, and/or modifying this functionality using this extensibility. The term "computing service provider" is used within this disclosure to refer to service providers such as hyperscalars, data center operators, entities that provide infrastructure-as-a-service (IaaS) and the like. A computing service provider is to be distinguished from a user in that the computing service provider typically creates a shell design that is loaded into the IC. The shell design specifies circuitry and/or executable program code for the IC that is loaded into the IC at boot time to create a base platform upon which applications of users (e.g., purchasers or consumers of the IaaS) may execute or run. The RoT architecture, including the firmware, is implemented within the IC as part of the shell design.

The firmware providing RoT functionality relies on a hardware implemented secure boot framework to form part of the RoT architecture of the IC. The extensibility of the firmware derives, at least in part, from a well-documented Application Programming Interface (API) implemented by the firmware. The API may be used by computing service providers to customize (e.g., add, limit/remove, or modify) functionality of the firmware and adapt the firmware to their respective needs. The extensibility allows customization of certain functions and/or behaviors of the IC that may be implemented as part of a shell design.

In one or more examples, the RoT architecture provides a well-defined, high-level queue interface for interacting with the host computer. The queue interface is managed by the IC itself. Via the queue interface, the IC provides control plane communication with the host computer without exposing hardware details of the IC, or sensitive circuitry implemented therein, to the host computer.

The RoT architecture, including the queue interface, improves security by limiting the ability of the host computer to access control registers and/or status registers of the IC. Further, by treating the host computer as an untrusted entity, any commands and/or data received from the host computer may be validated using the RoT architecture implemented in the IC itself prior to use or execution. This provides an additional level of security since any nefarious agents that may breach security of the host computer still must pass the validation performed by the IC itself to take control of the IC and/or its functionality. Further, the particular data paths through which the host computer initiates functions of the IC, in reference to the queue interface, are limited. This means that the host computer is unable to directly access any control registers of circuit blocks (e.g., Intellectual Property or "IP" cores) included in the IC. Further aspects of the inventive arrangements are described below with reference to the figures.

FIG. 1 illustrates an example of an HCS 100 in accordance with the inventive arrangements described herein. HCS 100 may include a data processing system, e.g., host computer 102, and an accelerator 104. As defined herein, "data processing system" means one or more hardware systems configured to process data, each hardware system including at least one processor programmed to initiate operations and memory. An example of a data processing system is a server.

Host computer 102 can include one or more host processors 106, a memory 108, and a bus 110 that couples various system components including memory 108 to host processor 106. Host processor 106 may be implemented as one or more processors. In an example, host processor 106 is implemented as a central processing unit (CPU). As defined herein, the term "processor" means at least one circuit capable of carrying out instructions contained in program code. The circuit may be an integrated circuit or embedded in an IC. Processor 106 may be implemented using a complex instruction set computer architecture (CISC), a reduced instruction set computer architecture (RISC), a vector processing architecture, or other known processor architecture. Example processors include, but are not limited to, processors having an x86 type of architecture (IA-32, IA-64, etc.), Power Architecture, ARM processors, and the like.

Bus 110 represents one or more of any of a variety of communication bus structures. By way of example, and not limitation, bus 110 may be implemented as a Peripheral Component Interconnect Express (PCIe) bus. Host computer 102 typically includes a variety of computer system readable media. Such media may include computer-readable volatile and non-volatile media and computer-readable removable and non-removable media.

Memory 108 can include computer-readable media in the form of volatile memory, such as random-access memory (RAM) 112 and/or cache memory 114. Host computer 102 also can include other removable/non-removable, volatile/non-volatile computer storage media. By way of example, storage system 116 can be provided for reading from and writing to a non-removable, non-volatile magnetic and/or solid-state media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 110 by one or more data media interfaces. Memory 108 is an example of at least one computer program product.

Program/utility 118, having a set (at least one) of program modules 120, may be stored in memory 108. Program/utility 118 is executable by processor 106. By way of example, program modules 120 may represent an operating system, one or more application programs, other program modules, and program data. Program modules 120, upon execution, cause host computer 102, e.g., processor 106, to carry out the functions and/or methodologies of the example implementations described within this disclosure. Program modules 120, for example, may implement the host runtime described herein. Program/utility 118 and any data items used, generated, and/or operated upon by host processor 106 are functional data structures that impart functionality when employed by host computer 102. As defined within this disclosure, the term "data structure" means a physical implementation of a data model's organization of data within a physical memory. As such, a data structure is formed of specific electrical or magnetic structural elements in a memory. A data structure imposes physical organization on the data stored in the memory as used by an application program executed using a processor.

Host computer 102 may include one or more Input/Output (I/O) interfaces 128 communicatively linked to bus 110. I/O interface(s) 128 allow host computer 102 to communicate with one or more external devices such as accelerator 104. I/O interfaces 128 may communicate over any of a variety of different types of communication channels such as Ethernet, PCIe, or other types of communication channels established over a local area network (LAN), a wide area network (WAN), or a public network (e.g., the Internet). Examples of I/O interfaces 128 may include, but are not limited to, network cards, modems, network adapters, hardware controllers, etc. Examples of external devices also may include devices that allow a user to interact with host computer 102 (e.g., a display, a keyboard, and/or a pointing device).

In an example implementation, the I/O interface 128 through which host computer 102 communicates with accelerator 104 includes or is implemented as a PCIe adapter. In that case, the communication channel linking host computer 102 and accelerator 104 may be a PCIe communication channel. In another example, I/O interface 128 may include or be implemented as a network interface controller (NIC). In that case, the communication channel linking host computer 102 and accelerator 104 may be Ethernet.

Host computer 102 can be practiced as a standalone device (e.g., as a user computing device or a server, as a bare metal server), in a cluster (e.g., two or more interconnected computers), or in a distributed cloud computing environment (e.g., as a cloud computing node) where tasks are performed by remote processing devices that are linked through a communications network. In a distributed cloud computing environment, program modules may be located in both local and remote computer system storage media including memory storage devices.

As used herein, the term "cloud computing" refers to a computing model that facilitates convenient, on-demand network access to a shared pool of configurable computing resources such as networks, servers, storage, applications, ICs (e.g., programmable ICs) and/or services. These computing resources may be rapidly provisioned and released with minimal management effort or service provider interaction. Cloud computing promotes availability and may be characterized by on-demand self-service, broad network access, resource pooling, rapid elasticity, and measured service.

Host computer 102 may be operational with numerous other general-purpose or special-purpose computing system environments or configurations. Examples of computing systems, environments, and/or configurations that may be suitable for use with host computer 102 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Accelerator 104 may be implemented as a circuit board that couples to host computer 102. Accelerator 104 may, for example, be inserted into a card slot, e.g., an available bus and/or PCIe slot, of host computer 102. Accelerator 104 includes IC 150. Accelerator 104 also includes volatile memory 152 coupled to IC 150 and a non-volatile memory 154 also coupled to IC 150. Volatile memory 152 may be implemented as a RAM. In the example of FIG. 1, volatile memory 152 is external to IC 150. In other examples, volatile memory 152 may be included in IC 150. In still other examples, some volatile memory may be included in IC 150 while other volatile memory is external to IC 150 and disposed on accelerator 104. In any case, volatile memory 152 is considered local memory for IC 150. By comparison, memory 108 is considered local to host computer 102 and host processor 106. Non-volatile memory 154 may be implemented as flash memory. Non-volatile memory 154 is also external to IC 150 and may be considered local to IC 150.

IC 150 includes one or more processors capable of executing program code. In one aspect, IC 150 may also include programmable circuitry that is configurable to implement user-specified digital circuits. Programmable logic is an example of programmable circuitry. IC 150 may be implemented as an application specific IC (ASIC), a System-on-Chip (SoC), or other type of IC that includes at least one processor capable of executing program code and optionally one or more additional subsystems.

The example of FIG. 1 is not intended to suggest any limitation as to the scope of use or functionality of example implementations described herein. HCS 100 is an example of computer hardware that is capable of performing the various operations described within this disclosure. In this regard, HCS 100 may include fewer components than shown or additional components not illustrated in FIG. 1 depending upon the particular type of system that is implemented. The particular operating system and/or application(s) included may vary according to system type as may the types of I/O devices included. Further, one or more of the illustrative components may be incorporated into, or otherwise form a portion of, another component. For example, a processor may include at least some memory.

Some computing environments, e.g., cloud computing environments and/or edge computing environments using HCS 100 generally support the IaaS and/or FPGA-as-a-Service (FaaS) model. In the FaaS model, user functions are hardware accelerated as circuit designs implemented within programmable ICs operating under control of the (host) data processing system. Other examples of cloud computing models are described in the National Institute of Standards and Technology (NIST) and, more particularly, the Information Technology Laboratory of N IST.

Figure 2:
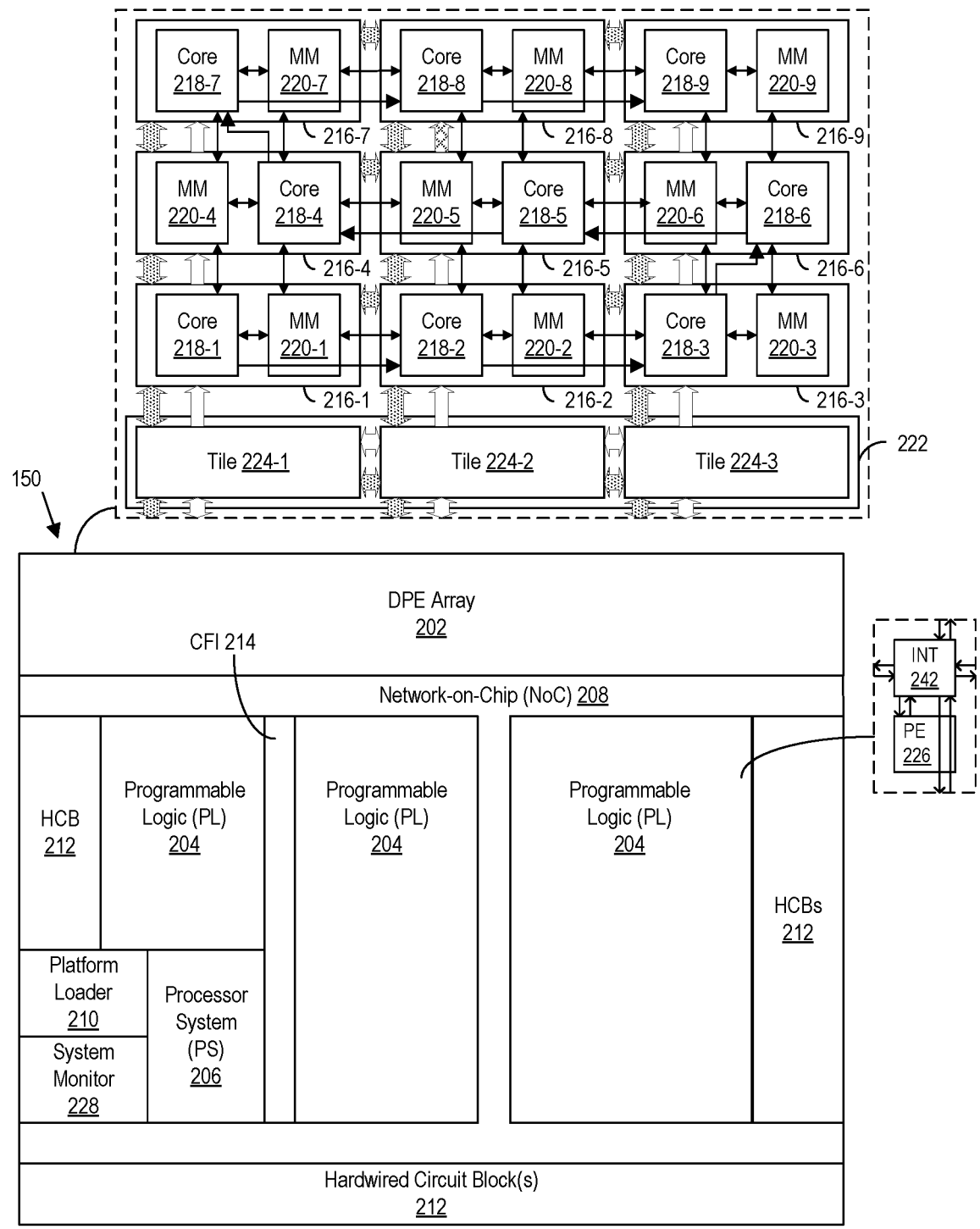
FIG. 2 illustrates an example architecture for an integrated circuit.

FIG. 2 illustrates an example architecture for IC 150. IC 150 is an example of a device that may be used as IC 150 of accelerator 104 of FIG. 1. IC 150 is an example of a programmable IC and an adaptive system. In one aspect, IC 150 is also an example of an SoC. In the example of FIG. 2, IC 150 is implemented on a single die provided within a single integrated package. In other examples, IC 150 may be implemented using a plurality of interconnected dies where the various programmable circuit resources illustrated in FIG. 2 are implemented across the different interconnected dies.

In the example, IC 150 includes a data processing engine (DPE) array 202, programmable logic 204, a processor system 206, a Network-on-Chip (NoC) 208, a platform loader 210, and one or more hardened circuit blocks 212. A configuration frame interface 214 also may be included. A system monitor 228 also may be included. It should be appreciated that the architecture of IC 150 is provided for purposes of illustration and not limitation. An IC for use with the inventive arrangements described herein may include any of a variety of combinations of the subsystems described herein. For example, an IC such as IC 150 may include one or more processors (e.g., processor system 206). In another example, an IC such as IC 150 may include one or more processors (e.g., processor system 206) in combination with programmable logic 204. In another example, an IC such as IC 150 may include one or more processors (e.g., processor system 206) in combination with a processor array such as DPE array 202. In another example, an IC such as IC 150 may include one or more processors (e.g., processor system 206) in combination with one or more hardened circuit blocks 212 (e.g., ASIC blocks).

DPE array 202 is implemented as a plurality of interconnected and programmable DPEs 216. DPEs 216 may be arranged in an array and are hardened. Each DPE 216 can include one or more cores 218 and a memory module (abbreviated "MM" in FIG. 2) 220. In one aspect, each core 218 is capable of executing program code stored in a core-specific program memory contained within each respective core (not shown). Each core 218 is capable of directly accessing the memory module 220 within the same DPE 216 and the memory module 220 of any other DPE 216 that is adjacent to the core 218 of the DPE 216 in the up, down, left, and/or right directions. For example, core 218-5 is capable of directly reading and/or writing (e.g., via respective memory interfaces not shown) memory modules 220-5, 220-8, 220-6, and 220-2. Core 218-5 sees each of memory modules 220-5, 220-8, 220-6, and 220-2 as a unified region of memory (e.g., as a part of the local memory accessible to core 218-5). This facilitates data sharing among different DPEs 216 in DPE array 202. In other examples, core 218-5 may be directly connected to memory modules 220 in other DPEs.

DPEs 216 are interconnected by programmable DPE interconnect circuitry. The programmable DPE interconnect circuitry may include one or more different and independent networks. For example, the programmable DPE interconnect circuitry may include a streaming network formed of streaming connections (shaded arrows) implemented using a plurality of interconnected stream switches and a memory mapped network formed of memory mapped connections (unshaded arrows) implemented using a plurality of interconnected stream switches.

Loading configuration data into control registers of DPEs 216 by way of the memory mapped connections allows each DPE 216 and the components therein to be controlled independently. DPEs 216 may be enabled/disabled on a per-DPE basis. Each core 218, for example, may be configured to access the memory modules 220 as described to facilitate communication among DPEs through shared memory modules 220 or only a subset of memory modules 220 to achieve isolation of a core 218 or a plurality of cores 218 operating as a cluster. Each streaming connection may be configured to establish logical connections between only selected ones of DPEs 216 to achieve isolation of a DPE 216 or a plurality of DPEs 216 operating as a cluster. Because each core 218 may be loaded with program code specific to that core 218, each DPE 216 is capable of implementing one or more different kernels therein.

In other aspects, the programmable DPE interconnect circuitry within DPE array 202 may include additional independent networks such as a debug network and/or an event broadcast network, each being independent (e.g., distinct and separate from) the streaming connections and the memory mapped connections. In some aspects, the debug network is formed of memory mapped connections and/or is part of the memory mapped network.

Cores 218 may be directly connected with adjacent cores 218 via core-to-core cascade connections. In one aspect, core-to-core cascade connections are unidirectional and direct connections between cores 218 as pictured. In another aspect, core-to-core cascade connections are bidirectional and direct connections between cores 218. In general, core-to-core cascade connections generally allow the results stored in an accumulation register of a source core to be provided directly to an input of one or more target or load cores. Activation of core-to-core cascade interfaces may also be controlled by loading configuration data into control registers of the respective DPEs 216.

In an example implementation, DPEs 216 do not include cache memories. By omitting cache memories, DPE array 202 is capable of achieving predictable, e.g., deterministic, performance. Further, significant processing overhead is avoided since maintaining coherency among cache memories located in different DPEs 216 is not required. In a further example, cores 218 do not have input interrupts. Thus, cores 218 are capable of operating uninterrupted. Omitting input interrupts to cores 218 also allows DPE array 202 to achieve predictable, e.g., deterministic, performance.

SoC interface block 222 operates as an interface that connects DPEs 216 to other resources of IC 150. In the example of FIG. 2, SoC interface block 222 includes a plurality of interconnected tiles 224 organized in a row. In particular embodiments, different architectures may be used to implement tiles 224 within SoC interface block 222 where each different tile architecture supports communication with different resources of IC 150. Tiles 224 are connected so that data may be propagated from one tile to another bi-directionally. Each tile 224 is capable of operating as an interface for the column of DPEs 216 directly above and is capable of interfacing such DPEs 216 with components and/or subsystems of IC 150 including, but not limited to, programmable logic 204 and/or NoC 208.

Tiles 224 are connected to adjacent tiles, to DPEs 216 immediately above, and to circuitry below using the streaming connections and the memory mapped connections as shown. Tiles 224 may also include a debug network that connects to the debug network implemented in DPE array 202. Each tile 224 is capable of receiving data from another source such as processor system 206, programmable logic 204, and/or another hardened circuit block 212. Tile 224-1, for example, is capable of providing those portions of the data, whether application or configuration, addressed to DPEs 216 in the column above to such DPEs 216 while sending data addressed to DPEs 216 in other columns on to other tiles 224, e.g., 224-2 or 224-3, so that such tiles 224 may route the data addressed to DPEs 216 in their respective columns accordingly.

Programmable logic 204 is circuitry that may be programmed to perform specified functions. As an example, programmable logic 204 may be implemented as field programmable gate array type of circuitry. Programmable logic 204 can include an array of programmable circuit blocks. As defined herein, the term "programmable logic" means circuitry used to build reconfigurable digital circuits. Programmable logic is formed of many programmable circuit blocks sometimes referred to as "tiles" that provide basic functionality. The topology of programmable logic 204 is highly configurable unlike hardened circuitry. Each programmable circuit block of programmable logic 204 typically includes a programmable element 226 (e.g., a functional element) and a programmable interconnect 242. The programmable interconnects 242 provide the highly configurable topology of programmable logic 204. The programmable interconnects 242 may be configured on a per wire basis to provide connectivity among the programmable elements 226 of programmable circuit blocks of programmable logic 204 and is configurable on a per-bit basis (e.g., where each wire conveys a single bit of information) unlike connectivity among DPEs 216, for example, that may include multi-bit stream connections capable of supporting packet-based communications. As noted, hardware kernels may be implemented in DPE array 202 and/or in programmable logic 204.

Processor system 206 is implemented as hardened circuitry that is fabricated as part of IC 150. Processor system 206 may be implemented as, or include, any of a variety of different processor types each capable of executing program code. For example, processor system 206 may be implemented as one or more processors. Each processor may include one or more cores. Each processor and/or core is capable of executing program code. In still another example, processor system 206 may include one or more processors, cores, modules, co-processors, I/O interfaces, and/or other resources. Example architectures that may be used to implement processors and/or cores of processor system 206 may include, but are not limited to, a CISC architecture, a RISC architecture, a vector processing architecture, or other known architecture. Example processors include, but are not limited to, processors having an x86 type of architecture (IA-32, IA-64, etc.), Power Architecture, ARM processors, and the like. In one or more example implementations, processor system 206 may execute a control program, e.g., a software kernel, that controls execution of an application (e.g., one or more kernels) within DPE array 202 and/or one or more kernels implemented in programmable logic 204.

In an example implementation, processor system 206 may include one or more hardened application processing units (e.g., application processors or "APUs") and one or more hardened real time processing units (e.g., real time processors or "RPUs"). In one aspect, one of the RPUs may be used to implement the RoT functionality described herein. That is, firmware may be loaded into IC 150 at boot time as part of a shell design by platform loader 210. The firmware, when executed by the RPU, configures the RPU to perform the RoT functions described herein. Thus, the RPU, in executing the firmware, forms at least a portion of the RoT architecture.

The RoT architecture includes circuitry of IC 150 (e.g., the RPU and/or queue interface described herein) and any trusted program code executed by such circuitry. The RoT architecture is capable of validating any host commands and/or data received from host computer 102. Whereas conventional HCSs utilize a computing paradigm in which the host computer is trusted by the accelerator and IC 150, in accordance with the inventive arrangements described herein, IC 150 does not consider the host computer 102 as a trusted entity. In this regard, the RoT architecture is responsible and capable of performing validation of any host commands and/or data received from the host computer 102. Only those host commands from host computer 102 that have been validated may be executed by the RoT architecture of IC 150 and only data from host computer 102 that has been validated may be loaded by the RoT architecture into IC 150. Examples of data that may be received from host computer 102 may include, but are not limited to, configuration data for DPE array 202, configuration data for programmable logic 204, executable program code for processors of processor system 206, configuration data for NoC 208, and configuration data for one or more hardened circuit blocks 212. The data, whether configuration or executable program code, may be provided as one or more programmable device images (PDIs). In some examples, the configuration data may be provided as one or more PDIs within a container file such as an "XCLBIN" file, or in another format. A PDI may also include a shell design that specifies a base platform that may be implemented in IC 150 and upon which user applications may be executed.

For purposes of illustration, examples of RoT functions that may be performed by the RPU operating as the RoT may include, but are not limited to, writing shell designs and/or Linux PDIs for configuring devices of IC 150 to flash memory (e.g., non-volatile memory 154), loading partial PDIs for partial configuration of IC 150, loading a Linux PDI from flash and booting one or more of the APUs using the Linux PDI, monitoring firewalls and notifying the host computer 102 of firewall status, monitoring various sensors of IC 150 and notifying host computer 102 of sensor data, performing a soft reset of accelerator 104, performing a soft reset of one or more of the APUs of IC 150, performing a soft reset of the DPE array 202, managing connectivity with host computer 102 via shared memory, clock gating and/or throttling, providing Debug and Maintenance Board (DMB) support, and performing data storage. The DMB provides Joint Test Action Group (JTAG) access to the accelerator 104. In the examples described herein, DMB access may be selectively enabled via an out-of-band (OOB) request as described herein in greater detail below. Though Linux is used as an example operating system, it should be appreciated that other operating systems may be executed by processors of IC 150. As such, the inventive arrangements are not intended to be limited by the particular operating system used, if any.

NoC 208 is a programmable interconnecting network for sharing data between endpoint circuits in IC 150. The endpoint circuits can be disposed in DPE array 202, programmable logic 204, processor system 206, and/or selected hardened circuit blocks 212. NoC 208 can include high-speed data paths with dedicated switching. In an example, NoC 208 includes one or more horizontal paths, one or more vertical paths, or both horizontal and vertical path(s). The arrangement and number of regions shown in FIG. 2 is merely an example. NoC 208 is an example of the common infrastructure that is available within IC 150 to connect selected components and/or subsystems.

Within NoC 208, the nets that are to be routed through NoC 208 are unknown until a user circuit design is created for implementation within IC 150. NoC 208 may be programmed by loading configuration data into internal configuration registers that define how elements within NoC 208 such as switches and interfaces are configured and operate to pass data from switch to switch and among the NoC interfaces to connect the endpoint circuits. NoC 208 is fabricated as part of IC 150 (e.g., is hardened) and, while not physically modifiable, may be programmed to establish connectivity between different master circuits and different slave circuits of a user circuit design. NoC 208, upon power-on, does not implement any application data paths or routes therein, but may provide default paths for loading configuration data into selected other subsystems. Once configured by platform loader 210, however, NoC 208 implements data paths or routes between endpoint circuits.

Platform loader 210 may be implemented as a hardened controller and is capable of performing operations including, but not limited to, system initialization and booting and configuration of various devices (e.g., sub-systems). In one aspect, platform loader 210 is capable of implementing a secure boot process. For example, platform loader 210, upon boot of IC 150, may load a shell design from a memory such as non-volatile memory 154. The shell design is a trusted design and may include the firmware that is to be executed by the RPU. The shell design also may include configuration data that, when loaded into IC 150, configures certain ones of the subsystems described herein (e.g., DPE array 202, programmable logic 204, processor system 206, NoC 208, and/or one or more of hardened circuit blocks 212) to implement a base platform on which one or more applications from one or more users may run or execute. The shell design may implement initial security within IC 150 including firewalls, memory protection, and the like. The firmware from the shell design that is executed by the RPU is trusted program code that establishes the RPU as the RoT, e.g., part of the RoT architecture. After the initial boot of the RPU is complete, platform loader 210 is capable of performing operations and may remain active during operation of IC 150.

Hardened circuit blocks 212 include special-purpose circuit blocks fabricated as part of IC 150. Though hardened, hardened circuit blocks 212 may be configured by loading configuration data into control registers to implement one or more different modes of operation. Examples of hardened circuit blocks 212 may include input/output (I/O) blocks, transceivers for sending and receiving signals to circuits and/or systems external to IC 150, memory controllers, or the like. Examples of different I/O blocks may include single-ended and pseudo differential I/Os. Examples of transceivers may include high-speed differentially clocked transceivers. Other examples of hardened circuit blocks 212 include, but are not limited to, cryptographic engines, digital-to-analog converters (DACs), analog-to-digital converters (ADCs), and the like. In general, hardened circuit blocks 212 are application-specific circuit blocks.

In one or more other examples, hardened circuit blocks 212 may include a RAM, e.g., one or more banks of RAM. As an example, the RAM may be a Double Data Rate (DDR) Synchronous Dynamic RAM. In still another example, hardware circuit blocks 212 may include a High-Bandwidth Memory (HBM).

Configuration frame interface 214 is an interface through which configuration data, e.g., a configuration bitstream, may be provided to programmable logic 204 to implement different user-specified circuits and/or circuitry therein. Configuration frame interface 214 is coupled to and accessible by platform loader 210 to provide configuration data to programmable logic 204. In some cases, platform loader 210 is capable of first configuring processor system 206 such that processor system 206, once configured by platform loader 210, may provide configuration data to programmable logic 204 via configuration frame interface 214.

The various programmable circuit resources illustrated in FIG. 2 may be programmed initially as part of a boot process for IC 150. During runtime, the programmable circuit resources may be reconfigured. In one aspect, platform loader 210 is capable of initially configuring DPE array 202, programmable logic 204, processor system 206, and NoC 208. At any point during runtime, platform loader 210 may reconfigure all or a portion of IC 150, e.g., under control of the RPU acting as the RoT. The RPU of processor system 206, upon operating as the RoT, may configure and/or reconfigure programmable logic 204 and/or NoC 208.

System monitor 228 is a sub-system of IC 150 that is capable of monitoring the physical environment of accelerator 104 and/or IC 150. System monitor 228 is capable of monitoring various temperature sensors on IC 150. For example, system monitor 228 is capable of monitoring the physical operating conditions of the IC 150 including the device's junction temperature, supply voltages, and external voltage. System monitor 228 may be coupled to one or more analog inputs that are digitized and made available to system monitor 228 for monitoring and comparison with known good or expected values.

It should be appreciated that the various devices and/or subsystems described in connection with IC 150 may include control registers for controlling operation of such devices and/or subsystems that may be read and/or written by the RPU operating as the RoT. IC 150 may also include status registers from which operating state information for such devices and/or subsystems may be read by the RPU operating as the RoT.

Figure 3:
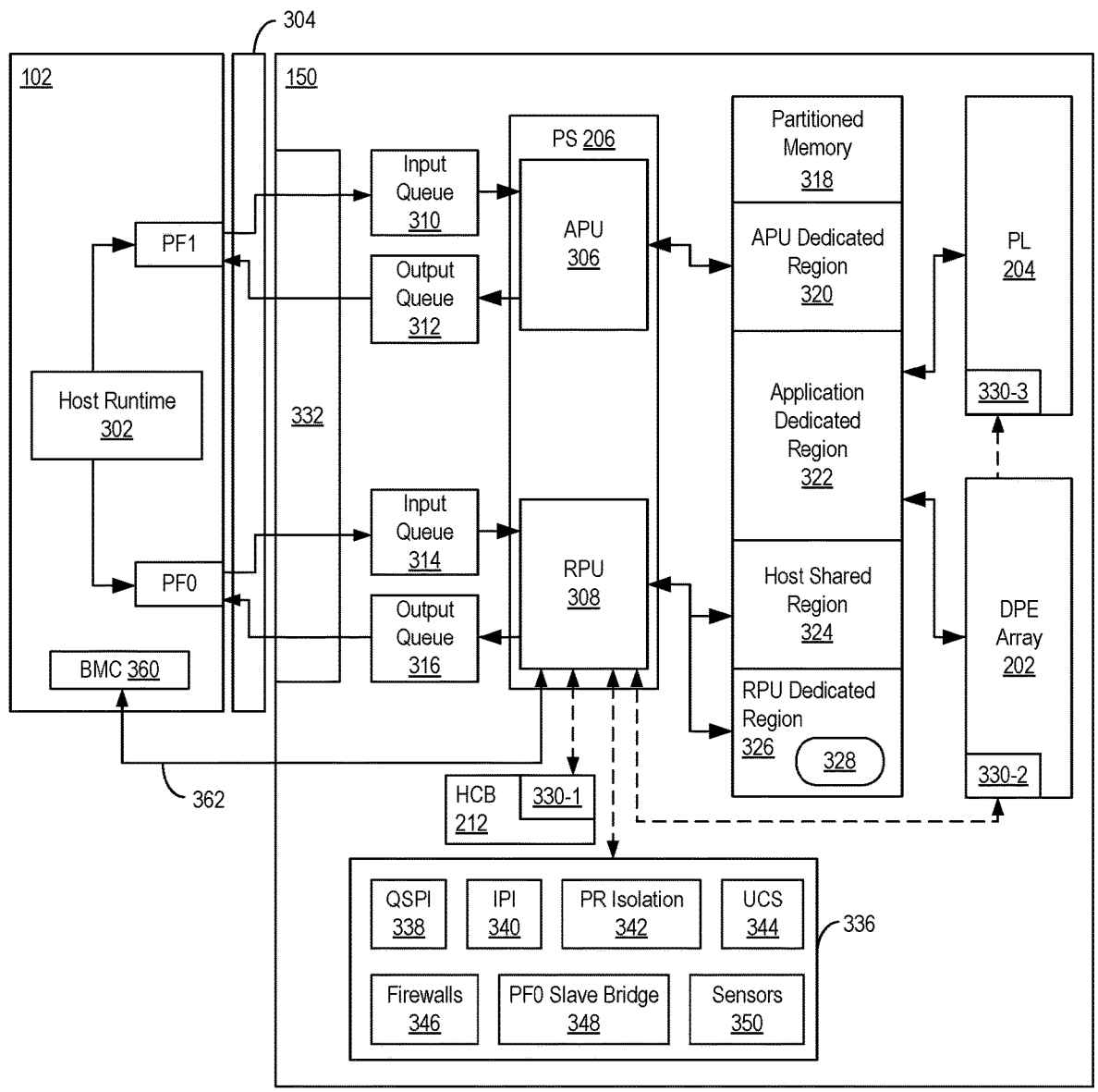
FIG. 3 illustrates certain aspects of a Root of Trust (RoT) architecture implemented within an IC in communication with a host computer of an HCS.

FIG. 3 illustrates certain aspects of the RoT architecture implemented by IC 150 in communication with the host computer 102. In the example, host computer 102 is communicatively linked with IC 150 via communication channel 304. In an example implementation, communication channel 304 is implemented as a PCIe communication channel. In another example, communication channel 304 is implemented over Ethernet. In the example, host computer 102 executes a host runtime 302. Host runtime 302 is implemented as program code stored in memory. Host runtime 302 is executable by host processor 106 (not shown) and, upon execution, allows host computer 102 to communicate with IC 150.

In the example, host computer 102 is capable of communicating with different processors of the processor system 206 of IC 150 by way of separate physical functions (PFs). As illustrated, host runtime 302, as executed by the host processor 106 of host computer 102, is capable of communicating with RPU 308 via PF0, while host runtime 302 communicates with APU 306 via PF1. As generally known, a PF refers to a PCIe function of a network adapter that supports the single root I/O virtualization (SR-IOV) interface. The PF function may be used to configure and manage the SR-IOV functionality of the network adapter, such as enabling virtualization and exposing PCIe Virtual Functions (VFs).

Using PF0 for RPU 308 and PF1 for APU 306 maintains completely separate access, e.g., a separate data path, for RPU 308. The data path between RPU 308 and PF0 may be considered a secure domain such that any applications executed by APU 306, implemented in programmable logic 204, implemented in DPE array 202, or the like will have no access to the control data path between the host computer 102 and RPU 308. That is, applications executing in IC 150 may not access the data path from PF0 to RPU 308.

IC 150 may include an endpoint 332 capable of establishing a communication link via communication channel 304. Endpoint 332 is coupled to input queue 310, output queue 312, input queue 314, and output queue 316. Processor system 206 includes an APU 306 and an RPU 308. Processor system 206 may include more than one RPU. Further, processor system 206 may include more than one APU.

Communication between host computer 102 and IC 150 may be performed by way of the example queues illustrated. In the example, APU 306 is capable of receiving one or more host commands from host computer 102 via input queue 310 and providing results to host computer 102 via output queue 312. Input queue 310 and output queue 312 are used to interact with applications executing in APU 306 or in other portions of IC 150 by way of APU 306. RPU 308 is capable of receiving one or more host commands from host computer 102 via input queue 314 and providing results to host computer 102 via output queue 316.

Via the control data path from PF0 to RPU 308, the host computer 102 is only able to write to input queue 314 and host shared region 324 and read from output queue 316 and host shared region 324. In terms of application-level processing, the host computer 102 is able to write to input queue 310 and host shared region 324, and read from output queue 312 and host shared region 324. In addition, regarding application-level processing, host computer 102 may also read/write to application dedicated region 322 directly or via PCIe direct memory access (DMA) engines (not shown). Accordingly, in one or more example implementations, host computer 102 is only able to communicate with IC 150 by way of the input queues 310, 314, output queues 312, 316, application dedicated region 322, and/or the host shared region 324. That is, host computer 102 is not permitted, and has no ability to, read directly from any registers, e.g., control or status, or other memory locations of IC 150 beyond those indicated. This means that the host computer 102 has no ability to directly access or control operation of IC 150 except through the aforementioned data channels.

Any configuration and/or loading of data for such other components of IC 150 must flow through RPU 308 acting as the RoT.

Partitioned memory 318 may be implemented as a RAM. In one example, partitioned memory 318 is an internal memory of IC 150. In another example, partitioned memory 318 may be implemented as volatile memory 152. In the example, partitioned memory 318 is partitioned or divided into a plurality of different partitions shown as regions. Partitioned memory 318 includes an APU dedicated region 320, an application dedicated region 322, a host shared region 324, and an RPU dedicated region 326. APU dedicated region 320 may only be accessed by APU 306. Accordingly, no other subsystems or devices of IC 150 may access APU dedicated region 320 with the exception of RPU 308 operating as the RoT. Similarly, host computer 102 may not access APU dedicated region 320. Application dedicated region 322 may be accessed by one or more particular applications. Such applications may be implemented using programmable logic 204, DPE array 202, one or more application processors (e.g., APU(s) 306) of processor system 206, or any combination thereof. As noted, the host computer 102 may read/write to application dedicated region 322 directly or via one or more PCIe DMA engines. Host shared region 324 may be accessed by host computer 102 (e.g., host processor 106 in executing host runtime 302) and RPU 308. RPU dedicated region 326 may only be accessed by RPU 308. Accordingly, no other subsystems or devices of IC 150 may access RPU dedicated region 326. Similarly, host computer 102 may not access RPU dedicated region 326.

In the example, RPU dedicated region 326 may store firmware 328. Firmware 328 may be loaded as part of a shell design within IC 150. Firmware 328, in combination with RPU 308, forms at least part of the RoT architecture described herein. In the example, the only way in which host computer 102 is permitted to request certain operations from IC 150 that are implemented by RPU 308 as part of the RoT architecture is to submit host commands to RPU 308 by way of input queue 314. For example, a host command provided from host computer 102 to input queue 314 may request a function and specify data that host computer 102 may store in host shared region 324, where the data may be used in implementing or executing the provided host command.

For purposes of illustration, the IP cores 336, e.g., circuit blocks, of IC 150 are referred to as "RPU only IP cores" in that such IP cores may not be directly accessed by host computer 102. Host computer 102 may only access the functionality of such IP cores indirectly by way of sending host commands to input queue 314 for execution by RPU 308, where the host commands request functions of RPU only IP cores 336. The RPU only IP cores 336 may include, but are not limited to, a Quad Serial Peripheral Interface (QSPI) 338 for reading from and writing to non-volatile memory 154 (e.g., a flash to load image files or other configuration data), an Inter-Processor Interrupt (IPI) 340 to send configuration data to the configuration engine (not shown) of IC 150 responsible for loading configuration data into configuration memory, a Partial Reconfiguration isolation 342 responsible for isolating PR regions from other regions during partial reconfiguration, a Universal Clocking Subsystem (UCS) 344 used to clock user regions of IC 150, firewalls 346 capable of protecting the host PCIe and RPU 308 from invalid transactions (e.g., AXI transactions) performed by untrusted PL 204 and DPE array 202, a PF0 slave bridge 348, and sensors 350 (e.g., card management controller (CMC) sensors, satellite controller (SC) sensors and/ or other sensors accessible through the system monitor 228). Thus, in cases where host computer 102 requires access to such functions provided by the RPU only IP cores 336, the host computer 102 must submit host commands to input queue 314 to do so. RPU 308, in reading host commands from input queue 314, is capable of accepting the host commands responsive to a successful validation of the host commands or rejecting the host commands responsive to a failed validation.

In the example of FIG. 3, DPE array 202, programmable logic (PL) 204, and hardened circuit block(s) 212 each include control registers 330. In the example, RPU 308 is capable of reading and writing to control registers 330 in each respective subsystem and/or circuit block. RPU 308 is capable of controlling operation of hardened circuit block(s) 212, DPE array 202, and/or programmable logic 204 on behalf of host computer 102 responsive to validated host commands received from host computer 102.

In another example, RPU 308 optionally is coupled to a Baseboard Management Controller (BMC) 360. BMC 360 may be implemented in host computer 102. The communication channel linking RPU 308 with BMC 360 is separate and independent of communication channel 304. In this regard, the communication channel between BMC 360 and RPU 308 may be referred to as an OOB communication channel 362. By way of the BMC 360 and the OOB communication channel 362, a system administrator may provide host commands directly to RPU 308 during runtime (e.g., operation of IC 150 within HCS 100) effectively bypassing the queues previously described. For purposes of discussion, host commands received via the OOB communication channel 362 are referred to herein as "administrative commands." By way of the OOB communication channel 362, an administrator may enable certain RoT functions for a limited time and subsequently disable such RoT functions.

As an illustrative and non-limiting example, via OOB communication channel 362, an administrator may turn on a function that allows host computer 102 to request writing of a new shell design or PDI to non-volatile memory 154. Once the functionality is enabled, host computer 102 may submit a host command requesting such action to input queue 314 and provide the shell design or PDI to the host shared region 324. Once RPU 308 performs any necessary validation of the host command and/or the data, RPU 308 may write the data to the non-volatile memory 154. In response to completion, the administrator may disable the capability to write to non-volatile memory 154 by submitting an administrative command via OOB communication channel 362. Once disabled, any subsequent host commands from host computer 102 provided to input queue 314 to write to non-volatile memory 154 will be denied by RPU 308.

Figure 4:
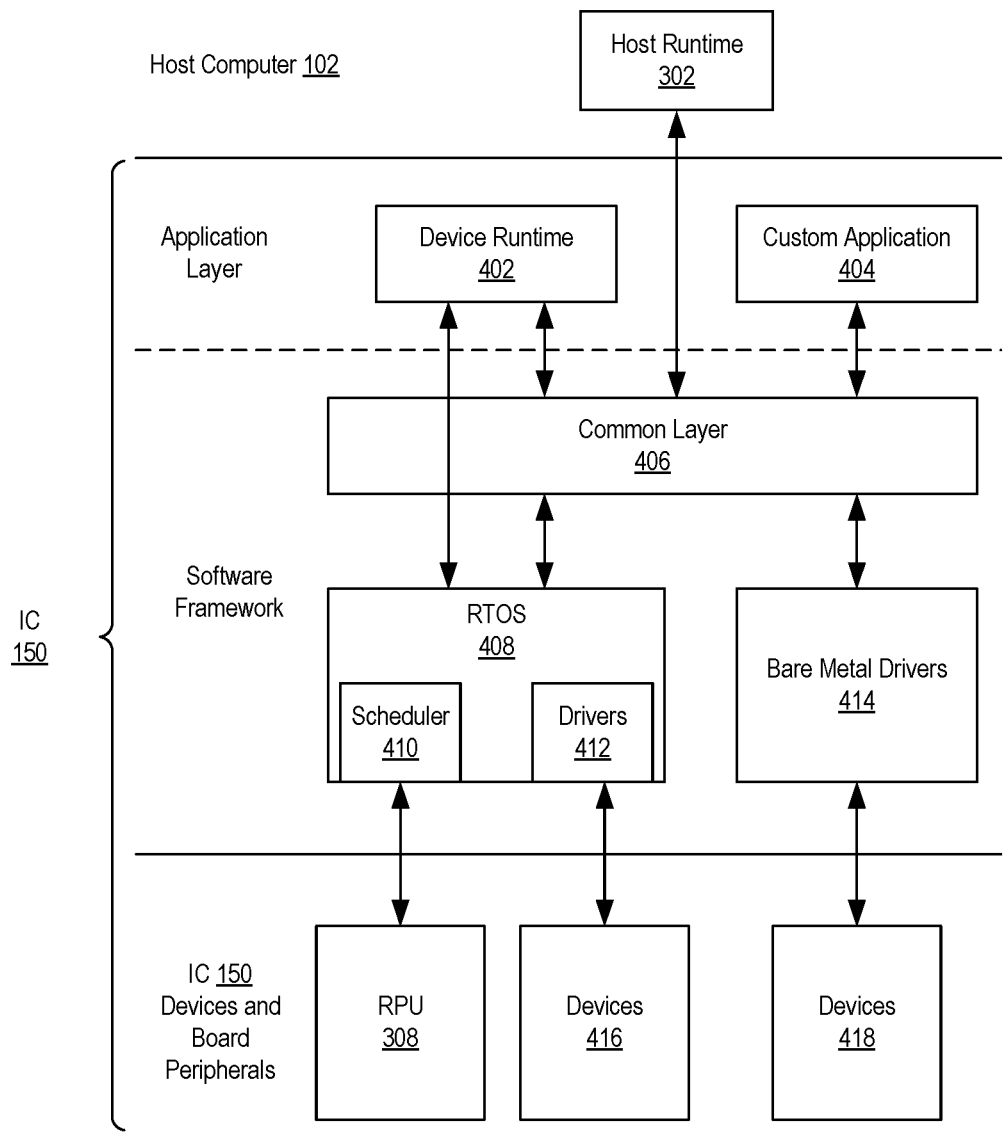
FIG. 4 illustrates certain software implemented features of the RoT architecture as implemented in an IC.

FIG. 4 illustrates certain software implemented features of the RoT architecture as implemented in IC 150. In the example, host runtime 302 executes in host computer 102. Host runtime 302 is capable of communicating with IC 150. For example, host runtime 302 may be the entity that submits host commands to input queue 314, reads and/or writes to host shared region 324, and reads results from output queue 316.

Within IC 150, the application layer may include a device runtime 402 and optionally a custom application 404. A software framework layer may include a common layer 406. Common layer 406 may communicate with device runtime 402 and optional custom application 404. The software framework layer may also include a real time operating system (RTOS) 408 having a scheduler 410 and one or more drivers 412. The software framework layer may also include one or more bare metal drivers 414. As pictured, RTOS 408 may communicate directly with device runtime 402 and with common layer 406. Optional custom application 404 may communicate directly with common layer 406. Common layer 406 may communicate directly with bare metal drivers 414.

In the example of FIG. 4, device runtime 402, optional custom application 404, and common layer 406, taken collectively, may implement the firmware 328 of FIG. 3 that is responsible for implementing RoT functions. In certain example implementations, RTOS 408 and/or bare metal drivers 414 may also be included as part of firmware 328. Firmware 328, RTOS 408, and/or bare metal drivers 414 each may be stored in the RPU dedicated region 326 of partitioned memory 318. For purposes of illustration, device runtime 402 may implement or provide functions such as writing shell designs and PDIs to non-volatile memory 154, downloading partial PDIs from volatile memory 152 to IC 150, loading a PDI from volatile memory 152 to IC 150, monitoring firewalls of IC 150, notifying host runtime 302 of any attempted firewall breaches, monitoring sensors, performing a soft reset of accelerator 104, performing a soft reset of APU 306, and managing connectivity between IC 150 and host computer 102 via the host shared region 324. Such operations may be performed responsive to received host commands from host computer 102 requesting such operations.

The optional custom application 404 represents program code added to firmware 328 by a computing service provider during development of the firmware 328 and/or shell design. Optional custom application 404 may be compiled with, or added to, the firmware 328. Optional custom application 404 is capable of implementing one or more functions, limiting or disabling particular functions, and/or modifying existing RoT functions as performed by device runtime 402 as may be desired by the computing service provider. Optional custom application 404 is capable of implementing particular functions, examples of which may include, but are not limited to, inter-integrated circuit (I2C) sensor monitoring, sensor monitoring and data storage, DMB support, clock gating, and/or clock throttling for IC 150. In general, providing for inclusion of optional custom application 404 allows a computing service provider to build or include specific hardware control for RPU 308.

Common layer 406 is capable of implementing the API previously described that enables extensibility of firmware 328. In the example of FIG. 4, the optional custom application 404 may manage the aforementioned functions, disable or restrict RoT functions, and/or add other functions by accessing the API provided by common layer 406. In the example, devices 416 may represent one or more clocks of IC 150 and/or one or more Universal Asynchronous Receiver Transmitters (UARTs). Devices 418 may represent general queues such as input/output queue pairs 310, 312 and/or 314, 316, octal SPI (OSPI) driver for accessing one or two flash devices using different methods, I2C driver, the system monitor, UARTs, or the like.

Thus, any access to devices 416 and/or 418 may be through RPU 308 operating as the RoT using the host command and/or queuing data path described in connection with FIG. 3.

It should be appreciated that optional custom application 404 may be created and incorporated into firmware 328 during the development process. Optional application 404 allows a computing service provider to augment and/or modify the RoT functionality of IC 150 to suit particular needs. Once deployed, however, users that run one or more applications on IC 150 do not have access to RPU 308 or any of the various components of the firmware 328 (e.g., device runtime 402, optional custom application 404, or the common layer 406) or any program code executed from the RPU dedicated region 326.

Table 1 illustrates example host commands that may be provided from host computer 102 to input queue 314 for execution by RPU 308. As discussed, execution of any host command from input queue 314 by RPU 308 may be subject to successful validation of the host command and/or any data from the host computer 102, as stored in the host shared region 324, to which the host command refers (e.g., via pointer or offset).

TABLE 1

| Host command | Description |
| --- | --- |
| Load XCLBIN | The host system has stored an XCLBIN file (e.g., a container file including one or more PDIs and/or metadata) in the host shared region and is requesting that the IC load the designated file. The XCLBIN file may include configuration data for the IC. |
| Get Log Page | The host system is requesting status information from the IC. The status information may include event logs, readings from sensors, etc. |
| Reset Partition | The host system is requesting that a particular partition of the IC (e.g., a partial reconfiguration region) be cleared or reset in order to instantiate a new design therein. |
| Download PDI | The host system is requesting that a particular PDI be loaded into the IC and used to configure all or part of a subsystem or be executed by a processor. |
| Flash Update | The host system is requesting to store a new flash image (e.g., new/updated firmware) in the host shared region and requests the IC to update the QSPI image used to boot the IC on power on. The RPU firmware and IC configuration is loaded from QSPI on (e.g., in response to) power on. |
| Device Reset | The host system is requesting to reset the IC. |

Other examples of host commands that may be provided from the host computer 102 may include, but are not limited to, retrieving sensor data, configuring a clock of the IC (e.g., gating or throttling the clock), reloading a device driver (e.g., used by a processor within the IC), and/or loading a particular PDI for execution by the APU (e.g., where the APU is reset to execute the new PDI). Sensor data and/or other status data for IC 150 may be stored in one or more status registers and/or other memories that may be read by RPU 308 responsive to validated host commands to do so. The RPU 308 may write the requested data to the host shared region 324 for access by the host computer 102 and write a response to output queue 316 referring to the requested data.

As discussed, configuration data for IC 150 may include one or more PDIs. A PDI may be an executable for a processor of IC 150 (executable by a processor within the processor system 206), configuration data for programming all or a portion (e.g., a partition) of programmable logic 204, configuration data for programming all or a portion of the NoC 208, configuration data for programming all or a portion of the DPE array 202, and/or configuration data for programming one or more hardened circuit blocks 212.

The following is an example illustrating certain operational features of the RoT architecture described herein. Consider an example where the host computer 102 writes configuration data (e.g., an XCLBIN file) for IC 150 to the host shared region 324. Further, the host computer 102 submits to the input queue 314 a host command requesting loading of the XCLBIN file. The host command specifies the request to load and includes a reference to the configuration data stored in the host shared region 324.

The RPU 308, in executing the device runtime 402, is capable of copying the configuration file from the host shared region 324 to the RPU dedicated region 326. The device runtime 402 further causes RPU 308 to validate the configuration file. In one aspect, RPU 308 may store one or more certificates within the RPU dedicated region 326 that may be used to validate data (e.g., configuration data such as an XCLBIN file or a PDI) and/or host commands by comparing a signature of the data or host command with the certificate.

In response to successfully validating the host command and the data, the device runtime 402 causes the RPU 308 to instruct the platform loader 210 to load the various portions of configuration data contained in the XCLBIN file within the IC 150. For example, the RPU 308 may communicate with the platform loader 210 and instruct the platform loader 210 to load the various portions of configuration data by issuing one or more IPI commands to the platform loader 210. The platform loader 210, being accessible by the RPU 308 as the RoT, is permitted to access the RPU dedicated region 326 for purposes of loading configuration data responsive to the IPI commands issued from the RPU 308. In response to determining that the host command and/or the data does not pass the validation, e.g., validation is unsuccessful, the RPU 308 does not initiating loading of any data via the platform loader 210. In that case, RPU 308 may discard the host command and data.

As another example, in response to RPU 308 receiving a request for a particular log or sensor data, RPU 308 may validate the host command. In response to successfully validating the host command, RPU 308 may provide the requested data to the host computer 102. For example, the RPU 308 may write the requested data to a location in the host shared region 324 and write a response to output queue 316 that includes a reference (e.g., pointer or offset) to the requested data stored in the host shared region 324. In response to an unsuccessful validation of the host command, RPU 308 may simply provide a null value to the host computer 102 in the output queue 316.

In another aspect, one or more of the functions of the device runtime 402 may be disabled by the computing service provider at the time that firmware 328 is compiled. In that case, where the host computer 102 is requesting a function or service that has been disabled, RPU 308 may return a null value. For example, RPU 308 may read the host command from input queue 314, compare the host command against a list of allowable or enabled host commands maintained by device runtime 402 as part of validation, and only execute the host command in response to determining that the host command is allowed or enabled. RPU 308 further may first successfully validate the host command prior to executing the host command.

Another example operation that may be performed as part of validating a command may include, but is not limited to, checking that any received host command is well-formed. A well-formed command is one that follows any predetermined syntax rules, e.g., is syntactically correct. Accordingly, the RPU 308 may compare the received host command with predetermined syntax rules to ensure that the host command is well-formed prior to execution. Successful validation of the host command includes determining that the host command is well-formed.

Another example operation that may be performed as part of validating a command may include, but is not limited to, checking that the command is valid for a current operating state of the IC 150. For any given operating state of IC 150, RPU 308 may maintain a list of allowable host commands. That is, such commands are allowable only in particular and predefined operating states of the IC 150. Appreciably, the commands that are allowable may also be specified by listing operating states and indicating only those host commands that are not allowed (e.g., are prohibited or disabled) rather than listing allowable host commands. Successful validation of the host command includes determining that the received host command is an allowed host command (e.g., not prohibited or disabled) for the particular operating state in which the IC 150 is currently in.

Table 2 illustrates example operating states and prohibited host commands within the respective operating states listed. In one aspect, the prohibited host command checking described and/or other validation operations described herein, may be implemented as a host command verification state machine within RPU 308. Table 2 is provided for purposes of illustration and not limitation. The operating states listed may be associated with one or more additional prohibited host commands not shown in Table 2. Further, operating states may be defined that may be associated with certain allowed and/or prohibited commands.

TABLE 2

| Current Operating State | Host Commands Disabled |
| --- | --- |
| Idle | None |
| Flashing OSPI | XCLBIN download |
|  | Device reset |
| Firewall trip | XCLBIN download |
| (e.g., violation) | Flash QSPI |
| XCLBIN download | Device reset |
|  | Scheduling compute unit |
| Compute Unit is | XCLBIN download |
| running | Reloading device driver |
| Device driver | All operations except |
| is halted | xBMGMT and/or |
| (e.g., due to IC | XBUTIL (e.g., board |
| not responding) | management |
|  | utilities) to query |
|  | device status |

Referring again to FIG. 3, DPE array 202, programmable logic 204, and hardened circuit block 212 each include control registers 330. In the example, RPU 308 is capable of reading and writing to control registers 330 in each respective subsystem and/or circuit block. As discussed, RPU 308 is capable of controlling operation of hardened circuit block(s) 212, DPE array 202, and/or programmable logic 204 on behalf of host computer 102 responsive to validated host commands received from host computer 102. In another aspect, however, RPU 308 is capable of enabling and/or disabling each respective system or particular parts of such system(s) by writing appropriate data to the control registers 330 in each respective circuit block or system in response to administrative commands received over the OOB communication channel 362.

For example, during runtime and responsive to administrative commands, RPU 308 is capable of enabling (disabling) hardened circuit block 212 by writing to control registers 330-1 and subsequently disabling (enabling) hardened circuit block 212 by writing to control registers 330-1. During runtime and responsive to administrative commands, RPU 308 is capable of enabling (disabling) one or more portions of DPE array 202 or the entirety of DPE array 202 by writing to control registers 330-2 and subsequently disabling (enabling) one or more portions of DPE array 202 or the entirety of DPE array 202 by writing to control registers 330-2. During runtime and responsive to administrative commands, RPU 308 is capable of enabling (disabling) programmable logic 204 and/or one or more circuit blocks implemented in programmable logic 204 by writing to control registers 330-3 and subsequently disabling (enabling) programmable logic 204 and/or the one or more circuit blocks implemented in programmable logic 204 by writing to control registers 330-3.

Figure 5:
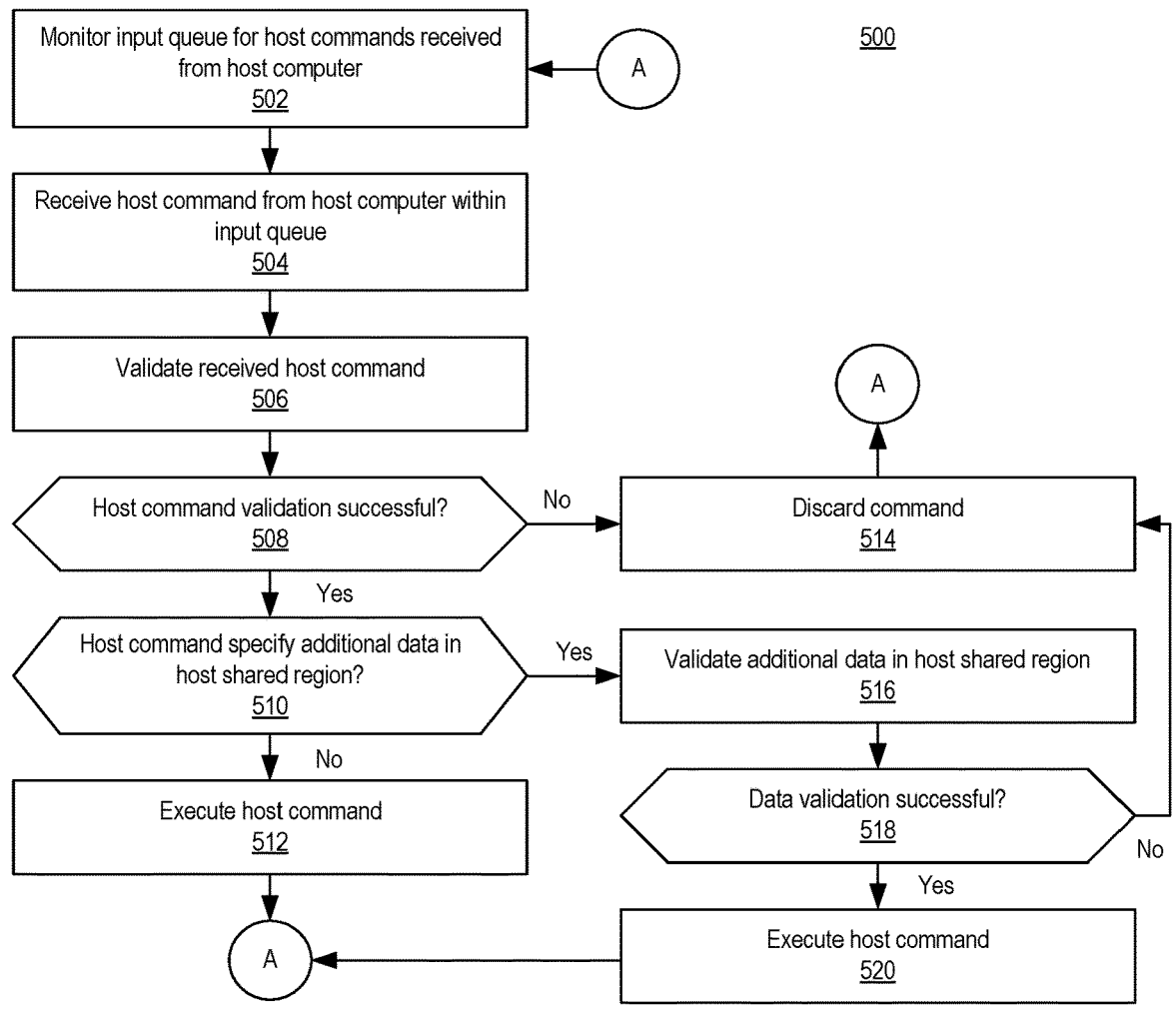
FIG. 5 illustrates an example method of operation for an RoT architecture as described within this disclosure.

FIG. 5 illustrates an example method 500 of operation for an RoT architecture as described within this disclosure. Method 500 may be performed by RPU 308 to perform RoT operations. In the example of FIG. 5, the IC has been booted so that RPU 308 is executing firmware 328, e.g., trusted RoT program code.

In block 502, the RPU 308 is capable of monitoring the input queue 314 for host commands received from the host computer 102. In block 504, the RPU 308 determines that a host command has been received from the host computer 102.

In block 506, the RPU 308 is capable of validating the received host command. In one aspect, validating the received host command includes comparing the received host command with the list of allowable or enabled host commands maintained by the device runtime 402. The list of allowable or enabled host commands may be generated as runtime 402 is compiled. In another aspect, the list of allowable or enabled host commands may be updated during operation of RPU 308 responsive to received administrative commands. Thus, the list may be updated over time and change. The host command is validated, at least in part, in response to determining that the host command received in the input queue 314 is one that is allowed or enabled.

In another aspect, the validation may include determining that the received host command is an allowable command given the particular operating state in which IC 150 is currently in. In another aspect, the validation may include determining that the received host command is well-formed.

Validating the host command may include one or more or all of the example validation operations described. In one or more example implementations, successful validation may include determining that the received host command is enabled, determining that the received host command is well-formed, and/or determining that the received host command is allowed or valid for the current operating state of the IC 150. Accordingly, in block 508, in response to determining that the received host command is valid, method 500 continues to block 510. In response to determining that the received host command is invalid, method 500 continues to block 514 where the RPU 308 discards the received host command. The host command, being considered invalid, is not executed. After block 514, method 500 may loop back to block 502.

Continuing with block 510, the RPU 308 determines whether the received host command specifies any additional data within the host shared region 324. For example, the RPU 308 determines whether the received host command includes a pointer or offset specifying a location of data stored in host shared region 324 by the host computer 102. In response to determining that the host command does specify data stored in the host shared region 324, method 500 continues to block 516. In response to determining that the host command does not specify data stored in the host shared region 324, method 500 continues to block 512, where the RPU 308 executes the host command. After block 512, method 500 may loop back to block 502.

Continuing with block 516, the RPU 308 is capable of validating the data stored in the host shared region 324 as indicated by the host command. In one aspect, the RPU 308 is capable of validating the data by determining whether the data includes a certificate that matches a certificate stored within the RPU dedicated region 326. The RPU 308 is capable of comparing the certificate of the data with a certificate stored in the RPU dedicated region 326. For example, the certificate may be stored in the RPU dedicated region 326 by loading the shell design. In response to determining that the certificate of the data matches the certificate stored in the RPU dedicated region 326, the RPU 308 determines that the data is valid. Accordingly, in block 518, in response to successful validation of the data, method 500 continues to block 520 to execute the host command. After block 520, method 500 may loop back to block 502.

In block 518, in response to determining that the data is not valid, e.g., where the certificate of the data does not match the certificate stored in the RPU dedicated region 326, method 500 continues to block 514 where the host command and the data are discarded. Thus, the host command is not executed. After block 514, method 500 may loop back to block 502.

In the example of FIG. 5, execution of a host command including data may include the RPU, responsive to determining that the data is valid, copying the data from the host shared region 324 to the RPU dedicated region 326 for processing and evaluation. For example, the RPU 308 may perform the certificate comparison once the data has been copied or moved to the RPU dedicated region 326.

Figure 6:
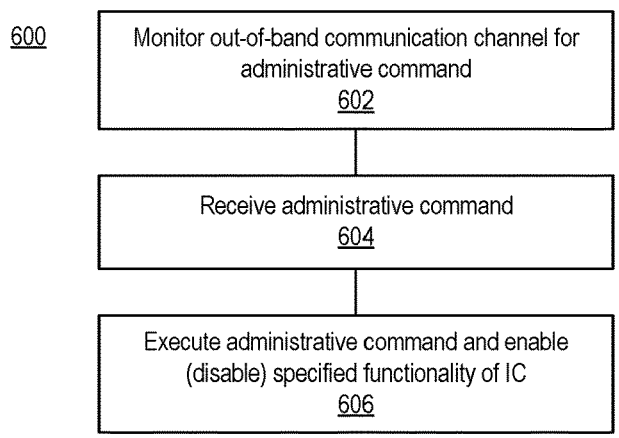
FIG. 6 illustrates another example method of operation for an RoT architecture as described within this disclosure.

FIG. 6 illustrates an example method 600 of operation for an RoT architecture as described within this disclosure. Method 600 may be performed by RPU 308 to perform RoT operations using the OOB communication channel 362. In the example of FIG. 6, the IC has been booted so that RPU 308 is executing firmware 328, e.g., trusted RoT program code.

In block 602, the RPU 308 is capable of monitoring for an administrative command on the OOB communication channel 362. In block 604, the RPU 308 receives an administrative command on the OOB communication channel 362. In block 606, the RPU 308 executes the received administrative command. The received administrative command may enable or disable particular functionality of the IC 150. RPU 308, responsive to administrative commands received over the OOB communication channel 362 is capable of enabling or disabling the specified functionality in real time during operation of IC 150.

In one or more example implementations, RPU 308 may perform one or more validation operations on administrative commands. As an illustrative and non-limiting example, the RPU 308 may check that any received administrative commands are well-formed and only execute such administrative commands in response to determining that the administrative command(s) is well-formed.

In one aspect, the RPU 308, in response to an administrative command is capable of enabling (disabling) one or more specified host commands, in reference to the host commands received in input queue 314, that are understandable by the device runtime 402. For example, in response to an administrative command to enable (disable) a particular host command, the RPU 308 may update the list of allowable administrative commands to indicate that the specified administrative command is enabled (disabled). Enabling (disabling) particular administrative commands effectively allows an administrator, by way of OOB communication channel 362, to specify, in real time, which functions of the RoT architecture are enabled at any given time and, as such, accessible by the host computer 102. In this respect, an administrator may override certain default settings of the firmware 328.

In another aspect, the RPU 308, in response to an administrative command is capable of enabling (disabling) particular subsystems or devices of IC 150. For example, RPU 308, in response to a received administrative command, is capable of writing data to control registers 330 to enable (disable) a selected subsystem or portion of the subsystem (e.g., one or more processors of the processor system 206, the programmable logic 204, the DPE array 202, and/or selected hardened circuit blocks). When a particular subsystem or portion thereof (e.g., a partition) is disabled, the host computer 102 is unable to access the disabled subsystem.

In the examples described herein, OOB communication and control is an example of an RoT function that is handled by RPU 308 operating as the RoT. Other examples of RoT operations that may be performed by RPU 308 operating as the RoT may include, but are not limited to, IC 150 (e.g., RPU 308) validating every command received from the host system, the RPU 308 completely managing the state of the IC 150, the RPU checking the signature of any data (e.g., XCLBIN and/or flash image(s)) provided to the IC 150 prior to using such data for programming and/or configuring any part of IC 150.

The example method of FIG. 6 may be performed by RPU 308 concurrently with the example method of FIG. 5. In this regard, certain functionality of the RPU 308 operating as the RoT may be enabled (disabled) at different points in time in responding to host commands based on those administrative commands that are processed.

Within the examples described within this disclosure, the RoT architecture is described in terms of using an RPU type of processor. It should be appreciated that the inventive arrangements may utilize any of a variety of different processors and/or processor types embedded within the IC for purposes of implementing an RoT architecture capable of performing the various operations described herein.

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

As defined herein, the singular forms "a," "an," and "the" are intended to include the plural forms as well, unless the context clearly indicates otherwise.

As defined herein, the terms "at least one," "one or more," and "and/or," are open-ended expressions that are both conjunctive and disjunctive in operation unless explicitly stated otherwise. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without human intervention.

As defined herein, the term "computer readable storage medium" means a storage medium that contains or stores program code for use by or in connection with an instruction execution system, apparatus, or device. As defined herein, a "computer readable storage medium" is not a transitory, propagating signal per se. A computer readable storage medium may be, but is not limited to, an electronic storage device, a magnetic storage device, an optical storage device, an electromagnetic storage device, a semiconductor storage device, or any suitable combination of the foregoing. The various forms of memory, as described herein, are examples of computer readable storage media. A non-exhaustive list of more specific examples of a computer readable storage medium may include: a portable computer diskette, a hard disk, a RAM, a read-only memory (ROM), an erasable programmable read-only memory (EPROM or Flash memory), an electronically erasable programmable read-only memory (EEPROM), a static random-access memory (SRAM), a portable compact disc read-only memory (CD-ROM), a digital versatile disk (DVD), a memory stick, a floppy disk, or the like.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the term "responsive to" and similar language as described above, e.g., "if," "when," or "upon," means responding or reacting readily to an action or event. The response or reaction is performed automatically. Thus, if a second action is performed "responsive to" a first action, there is a causal relationship between an occurrence of the first action and an occurrence of the second action. The term "responsive to" indicates the causal relationship.

As defined herein, the term "real time" means a level of processing responsiveness that a user or system senses as sufficiently immediate for a particular process or determination to be made, or that enables the processor to keep up with some external process.

As defined herein, the term "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

The terms first, second, etc. may be used herein to describe various elements. These elements should not be limited by these terms, as these terms are only used to distinguish one element from another unless stated otherwise or the context clearly indicates otherwise.

A computer program product may include a computer readable storage medium (or media) having computer readable program instructions thereon for causing a processor to carry out aspects of the inventive arrangements described herein. Within this disclosure, the term "program code" is used interchangeably with the term "computer readable program instructions." Computer readable program instructions described herein may be downloaded to respective computing/processing devices from a computer readable storage medium or to an external computer or external storage device via a network, for example, the Internet, a LAN, a WAN and/or a wireless network. The network may include copper transmission cables, optical transmission fibers, wireless transmission, routers, firewalls, switches, gateway computers and/or edge devices including edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations for the inventive arrangements described herein may be assembler instructions, instruction-set-architecture (ISA) instructions, machine instructions, machine dependent instructions, microcode, firmware instructions, or either source code or object code written in any combination of one or more programming languages, including an object-oriented programming language and/or procedural programming languages. Computer readable program instructions may include state-setting data. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some cases, electronic circuitry including, for example, programmable logic circuitry, an FPGA, or a PLA may execute the computer readable program instructions by utilizing state information of the computer readable program instructions to personalize the electronic circuitry, in order to perform aspects of the inventive arrangements described herein.

Certain aspects of the inventive arrangements are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, may be implemented by computer readable program instructions, e.g., program code.

These computer readable program instructions may be provided to a processor of a computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the operations specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the inventive arrangements. In this regard, each block in the flowchart or block diagrams may represent a module, segment, or portion of instructions, which comprises one or more executable instructions for implementing the specified operations.

In some alternative implementations, the operations noted in the blocks may occur out of the order noted in the figures. For example, two blocks shown in succession may be executed substantially concurrently, or the blocks may sometimes be executed in the reverse order, depending upon the functionality involved. In other examples, blocks may be performed generally in increasing numeric order while in still other examples, one or more blocks may be performed in varying order with the results being stored and utilized in subsequent or other blocks that do not immediately follow. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

An IC can include a queue configured to receive host commands from a host computer via a communication link with the host computer. The IC can include a processor coupled to the queue and configured to operate as an RoT for the IC through execution of firmware. The processor, responsive to executing the firmware, is configured to perform validation of the host commands read from the queue. The processor also can selectively execute the host commands in response to a successful validation of the host commands on a per host command basis. The host commands are executable by the processor to manage functions of the IC. The queue is implemented in a region of memory that is shared by the IC and the host computer.

The foregoing and other implementations can each optionally include one or more of the following features, alone or in combination. Some example implementations include all the following features in combination.

In one aspect, the firmware is extensible to include a custom application. The custom application can be configured to access one or more of the functions of the firmware via an API provided by a common layer of the firmware executed by the processor.

In another aspect, the processor is coupled to an OOB communication channel. The processor can be configured to perform at least one of enabling or disabling one or more of the functions of the IC during runtime responsive to receiving an administrative command over the OOB communication channel.

In another aspect, the one or more of the functions of the IC includes one or more host commands.

In another aspect, the one or more of the functions of the IC includes one or more circuit blocks of the IC.

In another aspect, the IC can include one or more circuit blocks and a plurality of control registers that directly control operation of the one or more circuit blocks. Direct access to the plurality of control registers by the host computer is prevented. The host computer accesses the plurality of control registers indirectly only by submission of one or more host commands to the queue for execution by the processor.

In another aspect, the IC can include a plurality of status registers that store runtime status information of the IC. Direct access to the plurality of internal status registers by the host computer is prevented. The host computer obtains the runtime status information only indirectly by submission of one or more host commands to the queue for execution by the processor.

In another aspect, in response to receiving a host command in the queue specifying a location of configuration data stored in the shared memory, the processor is configured to initiate loading of the configuration data into a configuration memory, a processor instruction memory, or configuration registers of the integrated circuit responsive to successfully validating the configuration data.

In another aspect, the processor is configured to validate the configuration data by copying the configuration data from the shared memory to a region of memory available only to the processor, validating the configuration data in the region of memory available only to the processor, and responsive to successfully validating the configuration data, instructing a platform loader to load the configuration data into the configuration memory, the processor memory, or the configuration registers of the integrated circuit.

In another aspect, the processor validates the configuration data using one or more certificates stored within a memory accessible only by the processor.

In another aspect, the processor is configured to validate each host command obtained from the queue, at least in part, by determining whether the host command is disabled within the firmware.

A method can include receiving, from a host computer and within a queue of an IC, a host command over a communication link with the host computer. The method can include validating, using a processor disposed in the IC, the host command. The method can include, responsive to successfully validating the host command, executing the host command using the processor. The host command is executable by the processor to manage a function of the IC. the method also can include preventing the host computer from directly accessing control registers of circuit blocks of the IC via the communication link to manage the integrated circuit.

The foregoing and other implementations can each optionally include one or more of the following features, alone or in combination. Some example implementations include all the following features in combination.

In one aspect, the method can include the processor receiving, via an OOB communication channel, an administrative command and, in response to the administrative command, enabling or disabling, using the processor, a selected host command during runtime.

In another aspect, the method can include the processor receiving, via an OOB communication channel, an administrative command and, in response to the administrative command, enabling or disabling, using the processor, a selected circuit block of the IC during runtime.

In another aspect, the method can include preventing the host computer from directly accessing control registers for one or more circuit blocks of the IC and providing the host computer with indirect access to the one or more circuit blocks only in response to receiving validated host commands within the queue.

In another aspect, the method can include preventing the host computer from directly accessing status registers of the IC, wherein the status registers store runtime status information of the IC. The method can include providing the host computer with indirect access to the status registers only in response to receiving validated host commands within the queue.

In another aspect, the method can include, in response to receiving a host command in the queue specifying a location of configuration data stored in a region of shared memory, the processor initiating loading of the configuration data into a configuration memory, a processor instruction memory, or configuration registers of the IC responsive to successfully validating the configuration data.

In another aspect, copying the configuration data from the shared memory to a region of memory available only to the processor, validating the configuration data in the region of memory available only to the processor, and, responsive to successfully validating the configuration data, instructing a platform loader to load the configuration data into the configuration memory, the processor memory, or the configuration registers of the integrated circuit.

In another aspect, the processor validates the configuration data using one or more certificates stored within a memory accessible only by the processor.

In another aspect, the method can include the processor validating each host command obtained from the queue, at least in part, by determining whether the host command is disabled within a device runtime executed by the processor.

What is claimed is:

1. An integrated circuit, comprising:
    a queue configured to receive host commands from a host computer via a communication link with the host computer; and
    a processor coupled to the queue and configured to operate as a Root of Trust (RoT) for the integrated circuit through execution of firmware, wherein the processor, responsive to executing the firmware, is configured to perform validation of the host commands read from the queue and selectively execute the host commands in response to a successful validation of the host commands on a per host command basis;
    wherein the host commands are executable by the processor to manage functions of the integrated circuit; and
    wherein the queue is implemented in a region of memory that is shared by the integrated circuit and the host computer.

2. The integrated circuit of claim 1, wherein the firmware is extensible to include a custom application, wherein the custom application is configured to access one or more of the functions of the firmware via an application programming interface provided by a common layer of the firmware executed by the processor.

3. The integrated circuit of claim 1, wherein:
the processor is coupled to an out-of-band communication channel; and
the processor is configured to perform at least one of enabling or disabling one or more of the functions of the integrated circuit during runtime responsive to receiving an administrative command over the out-of-band communication channel.

4. The integrated circuit of claim 3, wherein the one or more of the functions of the integrated circuit includes one or more host commands.

5. The integrated circuit of claim 3, wherein the one or more of the functions of the integrated circuit includes one or more circuit blocks of the integrated circuit.

6. The integrated circuit of claim 1, further comprising:
one or more circuit blocks; and
a plurality of control registers that directly control operation of the one or more circuit blocks;
wherein direct access to the plurality of control registers by the host computer is prevented and the host computer accesses the plurality of control registers indirectly only by submission of one or more host commands to the queue for execution by the processor.

7. The integrated circuit of claim 1, further comprising:
a plurality of internal status registers that store runtime status information of the integrated circuit;
wherein direct access to the plurality of internal status registers by the host computer is prevented and the host computer obtains the runtime status information only indirectly by submission of one or more host commands to the queue for execution by the processor.

8. The integrated circuit of claim 1, wherein:
in response to receiving a host command in the queue specifying a location of configuration data stored in the shared memory, the processor is configured to initiate loading of the configuration data into a configuration memory, a processor instruction memory, or configuration registers of the integrated circuit responsive to successfully validating the configuration data.

9. The integrated circuit of claim 8, wherein the processor is configured to validate the configuration data by:
copying the configuration data from the shared memory to a region of memory available only to the processor;
validating the configuration data in the region of memory available only to the processor; and
responsive to successfully validating the configuration data, instructing a platform loader to load the configuration data into the configuration memory, the processor memory, or the configuration registers of the integrated circuit.

10. The integrated circuit of claim 8, wherein the processor validates the configuration data using one or more certificates stored within a memory accessible only by the processor.

11. The integrated circuit of claim 1, wherein the processor is configured to validate each host command obtained from the queue, at least in part, by determining whether the host command is disabled within the firmware.

12. A method, comprising:
receiving, from a host computer and within a queue of an integrated circuit, a host command over a communication link with the host computer;
validating, using a processor disposed in the integrated circuit, the host command;
responsive to successfully validating the host command, executing the host command using the processor;
wherein the host command is executable by the processor to manage a function of the integrated circuit; and
preventing the host computer from directly accessing control registers of circuit blocks of the integrated circuit via the communication link.

13. The method of claim 12, further comprising:
the processor receiving, via an out-of-band communication channel, an administrative command; and
in response to the administrative command, enabling or disabling, using the processor, a selected host command during runtime.

14. The method of claim 12, further comprising:
the processor receiving, via an out-of-band communication channel, an administrative command; and
in response to the administrative command, enabling or disabling, using the processor, a selected circuit block of the integrated circuit during runtime.

15. The method of claim 12, further comprising:
preventing the host computer from directly accessing control registers for one or more circuit blocks of the integrated circuit; and
providing the host computer with indirect access to the one or more circuit blocks only in response to receiving validated host commands within the queue.

16. The method of claim 12, further comprising:
preventing the host computer from directly accessing status registers of the integrated circuit, wherein the status registers store runtime status information of the integrated circuit;
providing the host computer with indirect access to the status registers only in response to receiving validated host commands within the queue.

17. The method of claim 12, further comprising:
in response to receiving a host command in the queue specifying a location of configuration data stored in a region of shared memory, the processor initiating loading of the configuration data into a configuration memory, a processor instruction memory, or configuration registers of the integrated circuit responsive to successfully validating the configuration data.

18. The method of claim 17, further comprising:
copying the configuration data from the shared memory to a region of memory available only to the processor;
validating the configuration data in the region of memory available only to the processor; and
responsive to successfully validating the configuration data, instructing a platform loader to load the configuration data into the configuration memory, the processor memory, or the configuration registers of the integrated circuit.

19. The method of claim 17, wherein the processor validates the configuration data using one or more certificates stored within a memory accessible only by the processor.

20. The method of claim 12, further comprising:
the processor validating each host command obtained from the queue, at least in part, by determining whether the host command is disabled within a device runtime executed by the processor.

* * * * *